4 Sheets--Sheet 1.
PETER McINTYRE.
Improvement in Machines for Making Earthen Pipe.
No. 4,856. Fig. 1. Reissued April 9, 1872.
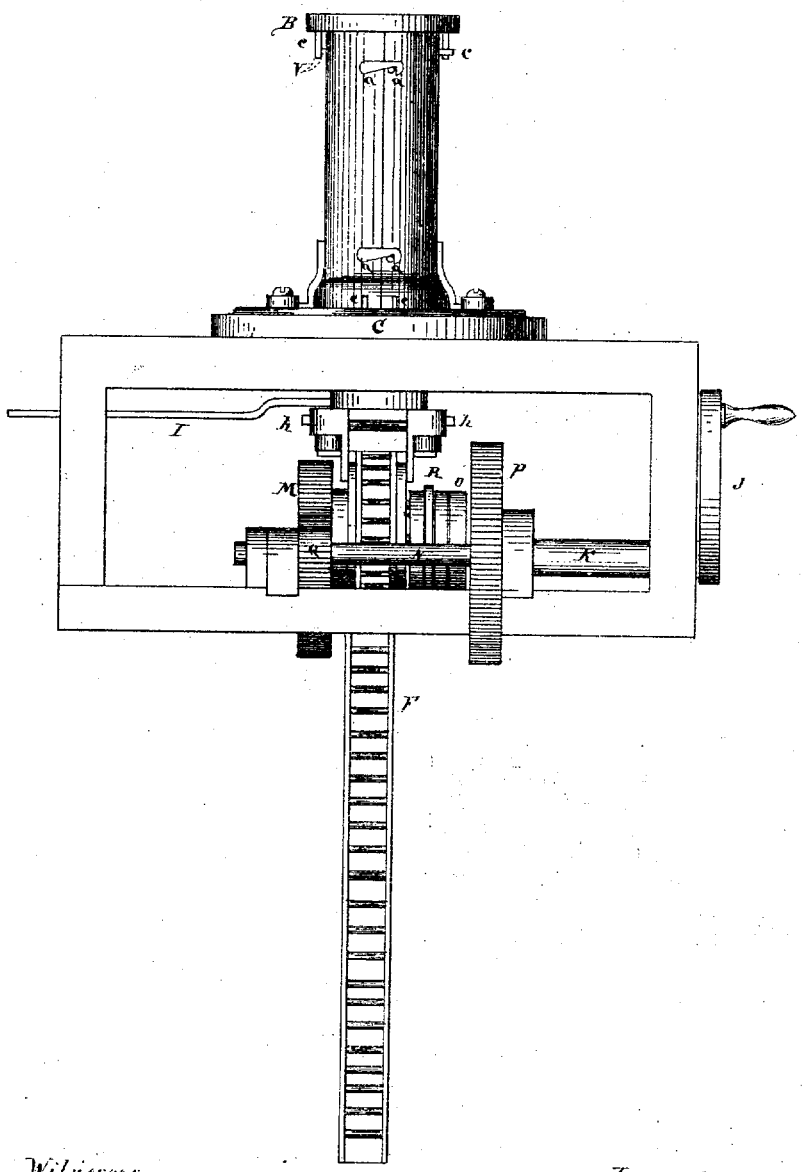
Witnesses.
Richmond Dickerson
Jeremy W. Bliss
Inventor.
Peter McIntyre 4 Sheets--Sheet 2.
PETER McINTYRE.
Improvement in Machines for Making Earthen Pipe.
No. 4,856. Reissued April 9, 1872.
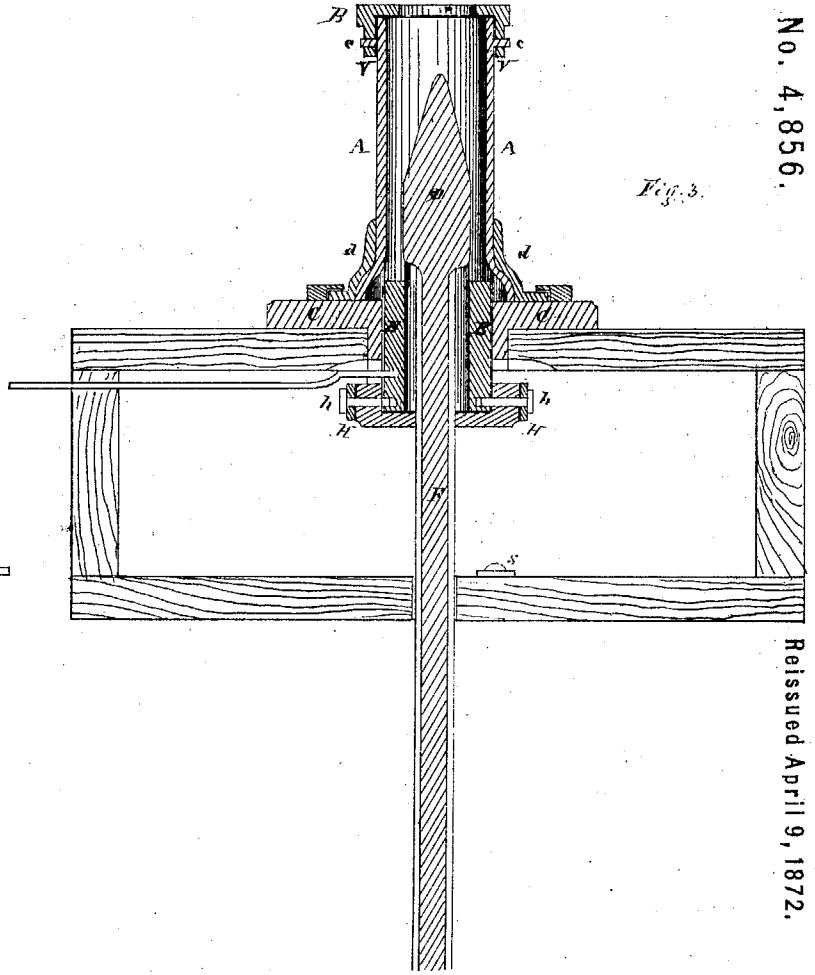
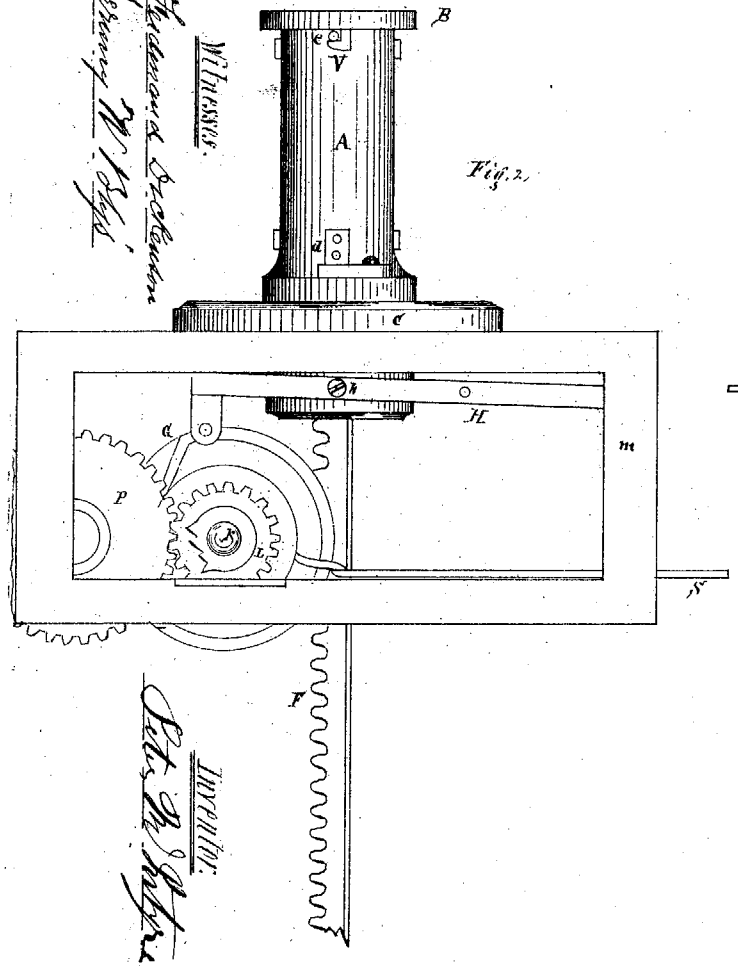
Witnesses.
Ferdinand Dickenson
Jeremy W. Phys
Inventor:
Peter McIntyre 4 Sheets--Sheet 3.
PETER McINTYRE.
Improvement in Machines for Making Earthen Pipe.
No. 4,856. Reissued April 9, 1872.
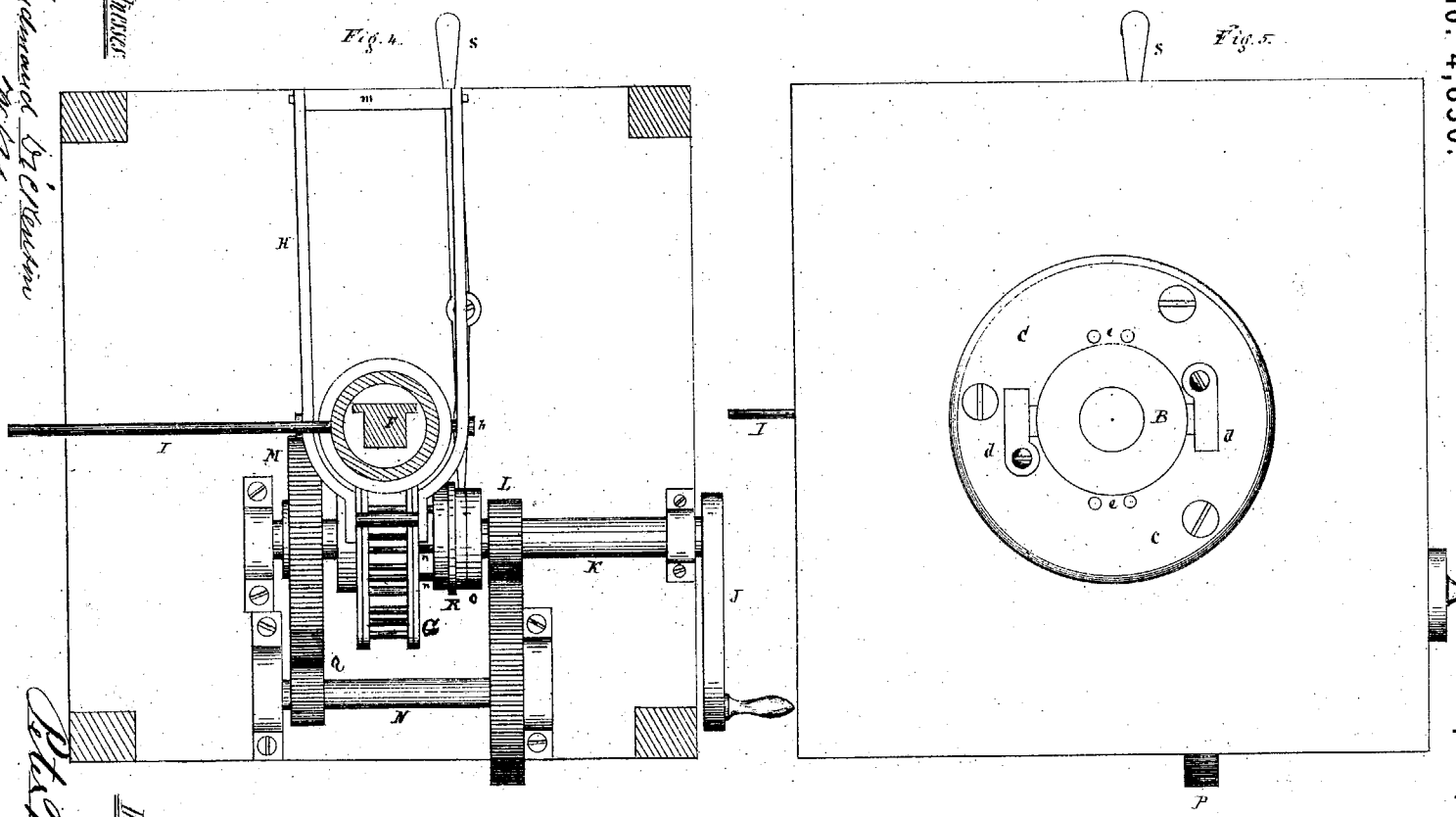
Witnesses:
Ferdinand Dieckmann
Jerry W. Betts
Inventor:
Peter McIntyre 4 Sheets--Sheet 4.
PETER McINTYRE.
Improvement in Machines for Making Earthen Pipe.
No. 4,856. Reissued April 9, 1872.
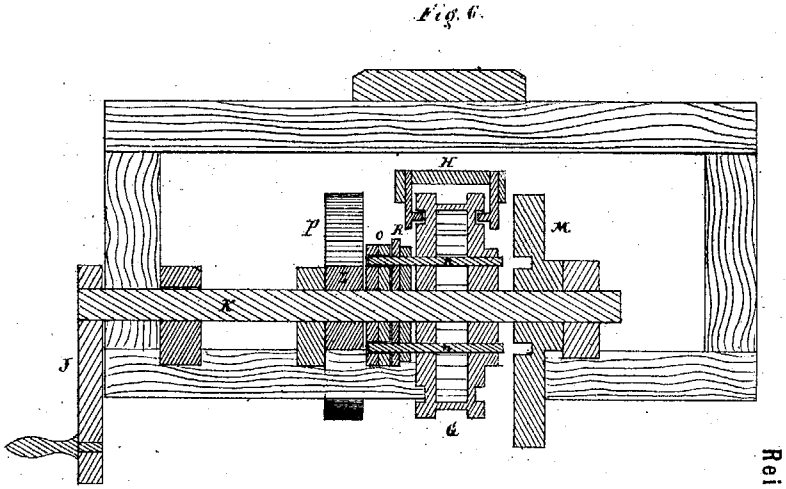
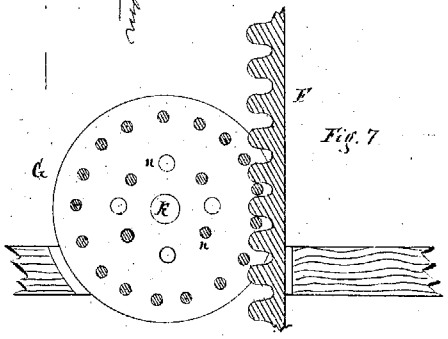
Witnesses.
Ferdinand Dickenson
Jeremy W Bliss
Inventor.
Peter McIntyre

UNITED STATES PATENT OFFICE.

PETER McINTYRE, OF NORWICH, CONNECTICUT.

IMPROVEMENT IN MACHINES FOR MOLDING EARTHEN PIPE.

Specification forming part of Letters Patent No. 97,668, dated December 7, 1869; reissue No. 4,856, dated April 9, 1872.

*To all whom it may concern:*

Be it known that I, PETER McINTYRE, of the city of Norwich, county of New London and State of Connecticut, have invented a new and useful Machine for Making Pipe of Hydraulic Cement or other suitable substance while in a plastic condition; and I do hereby declare that the following is a full, clear, and exact description of the construction and operation of said invention, reference being had to the accompanying drawing and to the figures and letters marked thereon, and in which—

Figure 1 is a front elevation; Fig. 2, a side elevation; Fig. 3, a vertical section through the axis of the pipe-mold; Fig. 4, a top view of the gearing; Fig. 5, a top view of the pipe-mold; Fig. 6, section through axis of driving-shaft, showing how the gears are engaged and disengaged; Fig. 7, a side elevation of the wallower and pipe-core rack.

The same parts are indicated by the same letters in all the figures.

The nature of this invention consists in such combination and arrangement of suitable molds and machinery as will produce pipes of hydraulic cement or suitable material of analogous character while in a plastic condition.

Heretofore drain-pipes have been exclusively made by manual labor, the material being rammed down into the annular space between the outer mold and the central core of the pipe, which is a tedious and laborious operation, and for the most part defective in its results.

To enable others skilled in the art to make and use my invention, I will proceed to describe its construction and operation.

I make the outer mold A A of metal, with a smooth central cavity of the necessary length, size, and shape for the exterior side and ends of the proposed pipe. This mold is divided longitudinally into two equal parts, as shown, which are readily secured to each other by the hooks and pins *a a*, and also by the cap piece B for finishing the end of the pipe, which is made to embrace both of the sides of the mold A A, and is secured to them by the catches and pins *c c*, which is effected by a partial rotation of the cap piece B upon the mold A A. The mold A A is also secured to the bed piece C, which is attached to the top floor of frame of the machine by means of the holders *d d* and guide-pins *e e*. The interior of the pipe is made by the action of the plungers D and E. The plunger E is a hollow cylinder, and through it the plunger D is made to pass. Both these plungers move upward either at the same time or at different times; but the plunger E, which forms the bell-mouth or end of the pipe, having a short motion, is quickly elevated to the proper height by means of a cam formed upon the side disks of the wallower, or other suitable device, as will presently be more fully explained. The plunger D is a cylinder corresponding in size to the bore of the pipe, and having its upper end conical, as shown, the whole of which conical part passes out through the cap piece B, which has a central opening in it of proper size for that purpose. I prefer to form the bell-mouth or end of the pipe by the action of the plunger E; but the part E may be stationary within the mold, if desirable, and attached to the bed piece C, or be so attached to it as to permit of a short rotative vibration, when required, to break the adhesion between it and the newly-formed pipe, in which case the bell-mouth of the pipe must be formed first by pressing the material into that part of the mold. The adhesion between the newly-formed pipe and the plunger may be broken by a short rotative vibration of the mold A. The plunger D is attached to the upper end of the rack F, the teeth of which gear or take into the trundles or rounds of the wallower G, and is made to work up and down to the necessary extent by the forward and reverse movement of the wallower or other suitable mechanism. The hollow plunger E, for making or forming the lower end of the pipe, is attached to and is worked by the lever H, composed of two flat bars or other mechanical equivalents, connecting with the plunger E below the bed piece C by means of two studs, *h h*, on its opposite sides, the points of which studs enter into short horizontal grooves in the lower part of the plunger, as shown in Fig. 3, so as to admit of a rotative movement or vibration on its axis to break the adhesion between the newly-formed pipe and the end of the plunger, which is accomplished by the hand-lever I, Fig. 4, or its equivalent. The adhesion between the newly-formed pipe and the plunger may be broken by a short rotative vibration of the mold A. The front end of the lever H is formed into a pair of arms, which rest upon and take into the grooved or slotted part of the cam made in the heads of the wallower G, to raise and retract the plunger E, as shown in Fig. 6. The shape and arrangement of this cam can be readily made such as to raise and retract the hollow plunger at any time during the ascent or descent of the solid plunger; but in using a short solid plunger, as shown, it is necessary for the successful operation of the machine that the cam should be shaped and arranged as described.

The machine is operated, by the crank J on the outer end of the shaft K, either by hand or by any other convenient first mover. Upon this shaft there is a fixed pinion, L, and a loose wheel, M; also, the loose wallower G and the fast clutch-plate O. Parallel with this shaft there is a second shaft, N, having a wheel, P, at one end, into which the pinion L gears, and at its opposite end the pinion Q, which gears into the loose wheel M on shaft K. Both these shafts are mounted in proper bearings, as shown in Fig. 4. Upon the shaft K is also the slider R, carrying the bayonets *n n*, which pass through the wallower G and serve as carriers for it, and combine it with the clutch-plate O or the loose wheel M as they are moved toward and are made to engage with one or the other by means of the lever S, Fig. 4, or its equivalent. When the bayonets *n n* enter the holes in the clutch-plate O, which is fast upon the shaft K, the wallower will have the same speed as the crank J, and will, therefore, have a quick motion, which motion I use for drawing down the plunger D on completing the pipe; and by moving the lever S in the opposite direction, so as to withdraw the bayonets *n n* from the clutch-plate O and insert them in the holes made for their reception in the loose wheel M, the wheel M will thereby become locked to or combined with the wallower G, and will consequently give it the increased power and reduced speed of the wheel M, according to the relative proportions of the wheels and pinions used in the train.

Having thus described the construction and operation of the mechanism, I shall now describe the process of making a pipe therein. The plungers D and E being at the lowest position in the mold A A, I pour or drop into the mold a sufficient quantity of cement or material for the required pipe, which must be at the time in a soft or plastic condition. I then turn the crank J with the increased power of the gearing on the wallower G, forcing the hollow plunger E up into the bell-mouth of the pipe, and the plunger D gradually up to the necessary height in the mold, the surplus material, if any, being forced out at the top of the mold by the conical part of the plunger D as it passes out through the cross-piece B, which completes the pipe. I now reverse the lever S so as to disengage the wallower G from the wheel M and engage it with the clutch O attached to the shaft K; then, on reversing the motion of the shaft K by the crank J, and also making a few lateral vibrations of the lever I, Fig. 3, so as to give a small alternate rotative movement to the plunger E or to the mold A, and thereby break the adhesion between it and the newly-formed pipe, the plunger D is first rapidly withdrawn from the mold or the interior of the newly-formed pipe; during which operation the hollow plunger supports the pipe in the mold, and then the plunger E is withdrawn. The rapid descent of the plunger serves to polish or smooth the inside of the pipe. To take the pipe from the mold, the cap B is first moved around sufficiently to disengage the catches *c c* from the holding-pins. The side parts A A are then opened and taken off the bed-plate; and, lastly, the finished pipe is removed from the machine and deposited in a convenient place to harden, allowing the newly-made pipe to remain in the mold some little time so as to allow it time to acquire the necessary stiffness to stand alone safely, duplicate molds being used for the making of ot s meanwhile. After removing the pipe, the several parts of the mold may be immediately put together and in place upon the machine, and the operation repeated. The pipe, by this arrangement and mode of operation, is produced with great rapidity when compared with hand-labor, and of much better quality.

The machine should be made to receive different sets of molds and plungers to suit the various sizes of pipe that are required. But, if they are to be very small or very large, it would be advantageous to have the machine of corresponding proportions.

I have herein described an operative machine that has been proved to work well in practice; but, as the means described are not the only ones by which the various motions may be produced, I do not confine myself to the gearing or the exact arrangement of the gearing herein given; as, for instance, a screw or other mechanical equivalents may be substituted for the rack F, and a screw-wheel or spur-wheel, with a nut in its center to work on such vertical screw, be substituted; and one speed only may be used instead of the fast and slow speeds I have mentioned, and still the operation and the result be substantially the same as by the means I have shown and described. I do not, therefore, limit myself to any particular system of gearing, but I claim the right, under this patent, to adopt and use any system of gearing that will best suit the intended purpose.

In describing the hollow plunger I have only shown its application to the production of a bell-mouth end. Obviously, however, it is quite as applicable to the production of a V-shaped end or the like, the shape and contour of the plunger being adapted to the shape of the pipe end which it is required to produce.

Having thus described the construction and mode of operating my pipe-molding machine, what I claim therein, and desire to secure by Letters Patent, is—

1. The combination of the outer mold with the solid and hollow plungers for forming the body of the pipe and its lower end, substantially in the manner and by the means described.

2. The annular plunger, having an axial movement, as described, and for the purpose set forth.

3. The combination of the solid and hollow plungers with the operating gearing in such wise as to elevate the hollow plunger to the proper height for forming the lower end of the pipe before the solid plunger has advanced any or much within the pipe-mold, and retaining it in that position till the solid plunger has completed its full stroke and is withdrawn from the mold, or nearly so, before dropping the hollow plunger, in the manner and for the purposes substantially as described.

4. The combination of the cap piece B, pins *c*, and hooks V with the side parts A A, when constructed and arranged to operate, as shown and described, for the double purpose of clamping said parts A A together and closing and completing the tops of the mold around the plunger, substantially as set forth.

PETER McINTYRE. [L. S.]

Witnesses:

JEREMY W. BLISS,

F. DICKENSON.